United States Patent Office 2,763,261
Patented Sept. 18, 1956

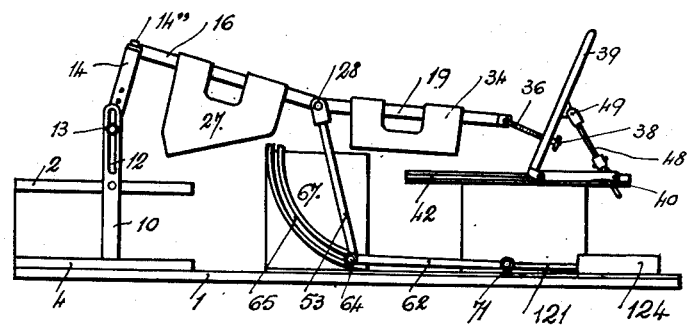

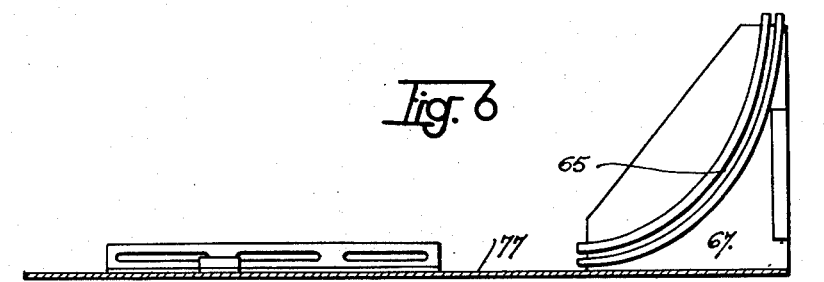
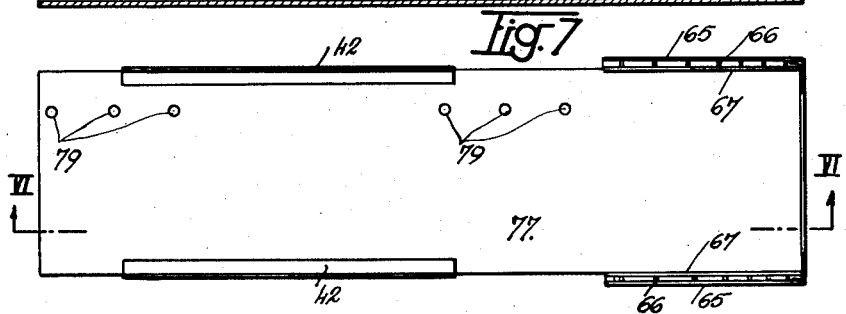
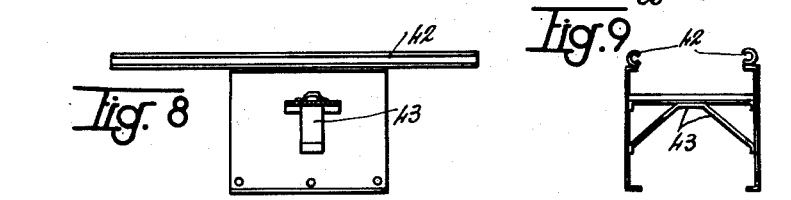
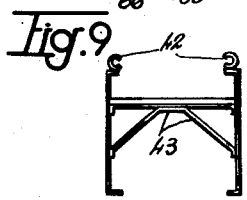
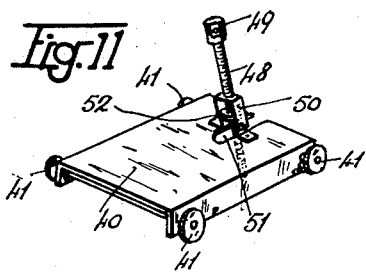
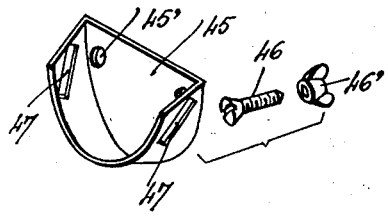
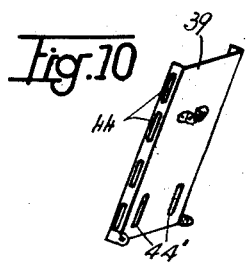

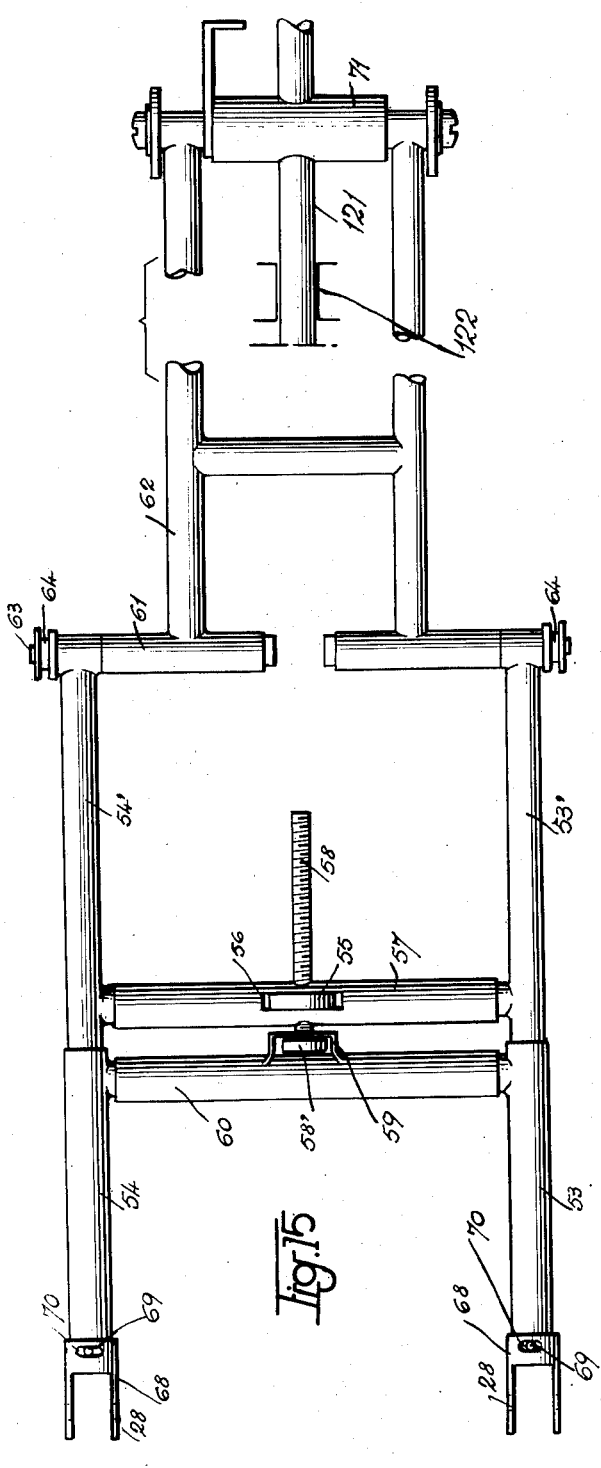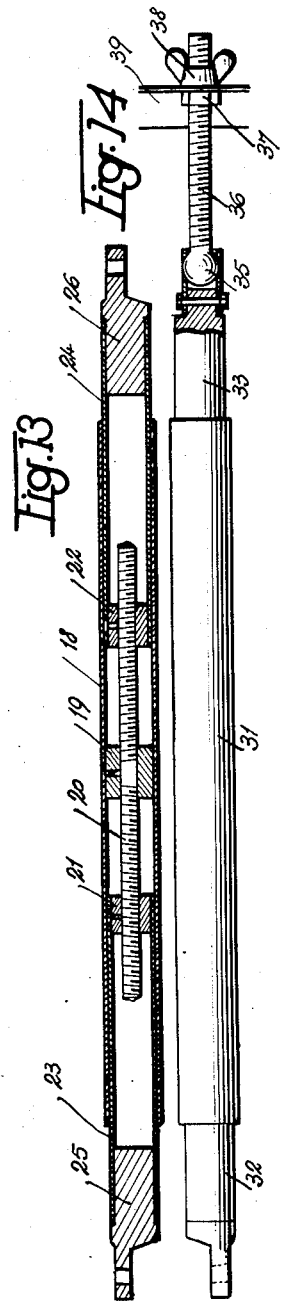

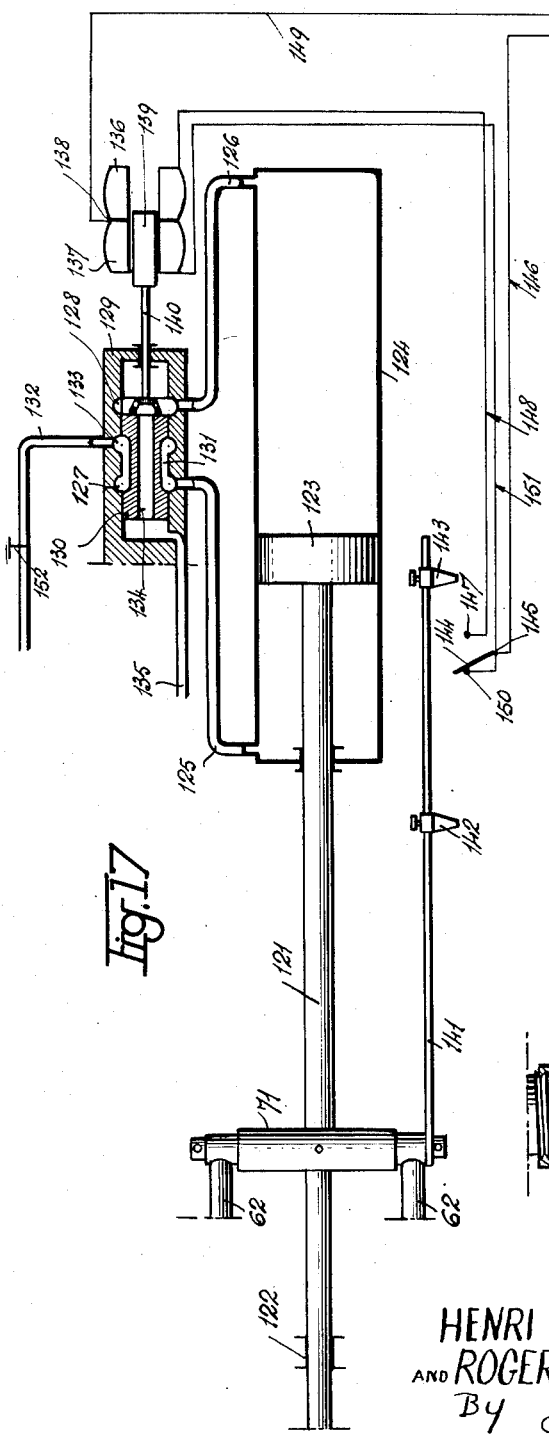
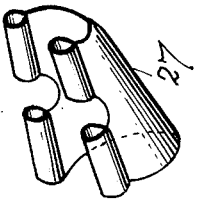
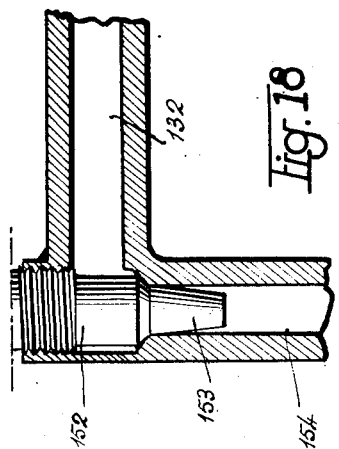

2,763,261

APPARATUS FOR CARRYING AND SHIFTING THE LOWER LIMBS OF A PATIENT AFTER A SURGICAL OPERATION

Henri Louis Masmonteil, Fecamp, and Roger François Vignardet, Rosny-sous-Bois, France Application February 17, 1954, Serial No. 410,776

Claims priority, application France February 20, 1953

13 Claims. (Cl. 128—33)

The present invention relates to devices for exercising limbs of convalescing patients.

After surgical operations on the lower limbs one has to always take into account two somewhat contradictory requirements: immobilization and mobilization of said limbs.

Immobilization is an absolute necessity for the closing up of the tissues, whether bone or flesh or the like soft parts. But the counterpart of this immobilization is an increase of the disorders of digestion produced by traumatism and the development of all conditions furthering anchylosis of the underlying and overlying joints.

Early or immediate mobilization of the limbs alone is capable of limiting these objectionable consequences of immobilization thereof.

However, the two above requirements have never been truly harmonized and such a harmonization can, as a matter of fact, be fully brought about only through a pivotally connected cradle or trough assuming a continuous traumatism-preventing movement and designed in a manner such that each limb or section of a limb is submitted to no strain during such movements.

Our novel apparatus includes chiefly a seat on which the patient is placed, a deformable cradle including three pivotally connected sections carrying respectively the thigh, the calf and the foot of the patient and the pivotal connections between which and between the upper section and the seat register with the joint at the upper end of the thigh bone, with the knee joint and with the ankle joint of the patient respectively, and lastly, means for mechanically shifting the pivoting sections of the deformable cradle under the action of any suitable control means so as to produce a slow and continuous mobilization according to a predetermined rhythm of the three fundamental above mentioned pivotal joints in the lower limb of the patient.

The principal object of the invention is to provide an apparatus quickly and easily adjustable to accommodate limbs of varying sizes and which apparatus will support and exercise an injured limb after treatment without strain thereto.

A further and important object of the invention is to provide an automatically operable limb exerciser having an adjustable seat permitting the ready use of the exerciser upon either a patient's right or left leg.

Further objects of the invention will be in part obvious and in part pointed out in the following detail description of the accompanying drawings, in which:

Fig. 1 is an elevational view of the apparatus;

Fig. 2 is a plan view thereof;

Fig. 3 is a perspective view of the plate carrying the apparatus;

Fig. 4 is a perspective view of the seat;

Fig. 5 is a diagrammatic view of the control mechanism for the pivotal connection registering with the knee joint.

Figs. 6 and 7 are respectively elevational and plan view of a modified carrier plate made of sheet metal;

Figs. 8 and 9 are respectively an elevational view and a view, seen endwise, of the rails for the movable carriage carrying in its turn the foot-rest and of the support for said rails.

Fig. 10 is a perspective view of the plate adapted to be carried by the foot-rest;

Fig. 11 is a perspective view of the carriage for the foot-rest;

Fig. 12 is a perspective view of the heel support and associated securing means;

Fig. 13 is an axial cross-sectional view of one of the tubular members extending to either side of the patient's thigh;

Fig. 14 is an elevational partly torn-off view of one of said tubular members extending to either side of the patient's thigh;

Fig. 15 is a plan view of the fork and control link for the pivotal connection registering with the knee joint, said parts being shown as in a common plane;

Fig. 16 is a perspective view of the trough carrying the thigh;

Fig. 17 is a diagrammatic general view of the driving system adapted to make the head of the apparatus reciprocate;

Fig. 18 shows the details of the needle valve provided for gradual adjustment purposes in said driving system.

Referring now more particularly to the accompanying drawings in which like and corresponding parts are designated by similar reference characters and in particular, Figs. 1, 2 and 3, the apparatus is shown as including a wooden carrier plate 1 carrying the different members and in particular a seat 2 (Figs. 1, 2 and 4) made of two sections carried each by a partition 3 carried in its turn by a small shiftable board 4.

Between the two parts 2 of the seat are slidingly carried small plates 5 which, when they have been removed, uncover the space between said two sections of the seat and allow positioning, underneath the patient, bed pans or the like receptacles intended for hygienic purposes.

The shiftable board 4 is adapted to move sideways over the carrier plate 1 on which it may be held fast in the position illustrated in Figs. 2 and 4 or else in a position symmetrical with reference to the longitudinal axis of said carrier plate on the right hand side thereof with reference to the patient, the seat being clamped in position by means of one or more hooks 6 secured to the carrier plate 1 and along which the board 4 is adapted to slide as clearly apparent from inspection of Fig. 3, while a screw 7 secured to the carrier plate 1 is adapted to engage selectively one of the two openings 8 provided in the board 4 (Fig. 2) after which a winged nut 9 is screwed over the screw 7 so as to hold the board 4 rigidly on the plate 1 in either of its lateral positions, respectively on the right hand side or on the left hand side of the patient.

To the sides of the seat 2 are secured metal carriers 10, 11 provided with vertical grooves 12 inside which may be shifted the pivots 13 rigid with a strap 14; the latter forms a kind of bridge-piece, the height of which is defined by the locations given to the pivots 13 in their grooves 12, the strap being held in the desired position e. g. by means of winged nuts which are not illustrated. The pivotal axes 13 should register with the upper ends or heads of the patient's thigh bones.

To the cross bar 14' of the strap 14 are secured by means of screws 14", two members 16 and 17 (Figs. 1 and 2). Each of said members is constituted by a central tube 18 (Fig. 13) rigid with a short inner sleeve 19 inside which is secured coaxially a rod 20 provided at one end with a thread having a right-handed pitch and at the other end with a thread having a left-handed pitch.

Over each of the threads of the rod 20 is screwed a nut 21 or 22 rigid respectively with a tube 23 or 24 slidably engaging the central tube 18. These outer tubes 23 and 24 carry at their outer ends corresponding attachments 25 or 26 secured respectively to the strap or bridgepiece 14 and to a system 29—30 similar to the tubular system 16—17 and which will be described hereinafter.

It is possible to move the extreme sliding tubes 23 and 24 towards or away from each other so as to shorten or lengthen as desired, the corresponding system 16—17. The sliding tubes 23 and 24 carry attachment loops for a trough 27 made of leather e. g which is intended to carry the patient's thigh, as shown in Figs. 1 and 16.

28 designates the points at which two members 29 and 30 are pivotally secured to the tubular members 16 and 17 (Fig. 2), the structure of said members 29 and 30 being similar to that of the members 16 and 17 and their lengths being likewise adjustable; in other words, each of said members includes a central tube 31 (Fig. 14) and two extreme sliding tubes 32 and 33 carrying, as precedingly, a trough 34 (Fig. 1), said trough 34 being intended to hold the patient's calf.

The pivotal axis 28 should register with the patient's knee joint.

To the end of each of the outer extreme tubes of the tubular members 29 and 30 is pivotally secured, by means of a ball joint 35 (Fig. 14) registering with the joint in the patient's ankle, a threaded rod 36 secured by means of a nut 37 and of a winged safety nut 38 to a foot-rest 39 (Figs. 1, 2 and 10) pivotally secured to the end of a carriage 40 (Figs. 1 and 11) provided with rollers 41 over which the carriage runs along the rails 42 (Figs. 1, 8 and 9) rigid with a support 43 secured to the carrier plate 1 of the apparatus.

The patient's feet rest on the foot rest 39 and are held securely thereon as provided by straps passing through the lateral slots 44 cut in the flanges of the footrest 39 (Fig. 10).

The patient's heels are carried by a detachable insert 45 (Fig. 12) which is vertically adjustable with reference to the foot-rest 39, said insert being secured by means of screws 46 passing through the slots 44' in the body of the foot-rest 39 and engaging openings 45' in the insert 45 so that said insert 45 may be clamped in its adjusted position by means of winged nuts 46' screwed over the screws 46. Straps passing through slots 47 in the insert 45 are adapted to hold the patient's heel fast. The insert is sufficiently wide to be capable of carrying feet wearing voluminous slippers.

The slope of the plate 39 is readily adjustable by means of a threaded rod 48 pivotally secured at 49 to the footrest 39 (Figs. 1 and 11) and passing through a stirrup-shaped member 50 secured to the carriage 40 and through a notch 51 in the latter; a striated nut 52 allows lowering or raising the threaded rod 48 so as to adjust the slope of the foot-rest 39 to the desired angle.

A suitable adjustment of the nuts and counternuts 37 and 38 on the threaded rods 36 allows adjusting as required the lengths of said rods 36 between the foot-rest 39 and their pivotal connection with the tubular members 29 and 30.

As apparent from inspection of Figs. 1 and 2, it is possible, assuming the patient is resting on the seat 2, to immobilize as required his right leg (Fig. 2) or his left leg between the cooperating members 16, 17 and 29, 30 with his foot resting on the foot rest 39, the immobilization of either leg being performed by shifting laterally the seat 2 towards the left of the patient, into the position illustrated in Fig. 2 for holding the right leg or towards the right hand side of the patient for holding the left leg and the tubular members 16 and 17 and the parts beyond same are secured to the right hand side or to the left hand side respectively of the cross bar 14' of the strap 14.

To the pivotal axis 28 registering with the patient's knee joints, are pivotally secured the two arms 53 and 54 of a tubular fork (Figs. 1 and 15) including each two telescopic tubes 53—53' and 54—54' slidingly engaging each other. The total length of the fork is adjustable through actuation of the striated wheel 55 screwed, inside an opening 56 provided in the cross-bar 57, on a threaded rod 58 extending through a strap 59 in a crossbar 60 on the fork, said threaded rod being held by its terminal expansion 58' inside said strap 59. The fork including the tubes 53—53' or 54—54' and the crossmembers 57 and 60 is pivotally secured through its free ends to the ends of a cross-member 61 rigid with a linking member 62.

The common pivotal spindle 63 carrying the tubes 53' and 54' of the fork and the member 61 rigid with the link 62, carries at each end a grooved roller 64 adapted to run along a rail 65. The two rails (Figs. 1, 5 and 6) assume a special arcuate shape which allows said rollers 64 to rise at a constant vertical speed. Said rails 65 are secured by means of screws and spacing members 66 (Fig. 7) to sheet iron members 67 rigid with and upstanding over the carrier plate 1 of the machine.

It should be remarked that the tubular arms 53, 54 of the fork end with stirrup-shaped members 68 pivotally secured to the pivotal axis 28 (Fig. 15) and that said stirrup-shaped members may execute each a rotation through a small angle with reference to and round the axes of the tubes 53, 54 corresponding thereto as allowed by a pin 69 rigid with said tubes and sliding inside an elongated opening 70 formed transversely inside the stirrup 68. This small angular shifting is adapted to prevent the friction that might arise by reason of the fact that the three cooperating axes 14", 28, 35 (Fig. 1) are not coplanar. The outer end of the linking member 62 is pivotally secured to a head 71 (Fig. 15).

All the parts mentioned hereinabove are mounted on the carrier plate 1 of the machine, preferably through the agency of a sheet iron plate 77 (Figs. 6 and 7) secured to said plate by two threaded rods 78 (Fig. 3) and by winged nuts that have not been illustrated and which are adapted to be screwed over said threaded rods. The latter are long enough to allow the insertion, between the plate 77 and the carrier plate 1, of boards or filler-blocks for the vertical adjustment of the plate 77. The latter is provided as shown in Fig. 7 with two groups of three openings 79, said openings being selectively engaged by the threaded rods 78 so as to allow the plate and parts carried thereby to occupy longitudinally one position selected out of three on the carrier plate 1 of the apparatus.

The head 71 is rigid with a rod 121 guided in the bearing 122 and with a piston 123 (Fig. 17) sliding inside a hydraulic cylinder 124 receiving the driving fluid selectively at either end through channels 125 and 126 leading out of annular grooves 127 and 128 of the body 129 of a distributor, the movable slide valve 130 of which is provided with an annular groove 131 extending over a substantial length of the slide valve body.

Water or the like driving fluid is fed into the pipe 132 opening into an annular groove 133 formed in the inner wall of the body 129. The movable slide valve 130 is provided with an axial channel 134. 135 designates the channel through which the water is exhausted after use.

The slide valve 130 assumes a reciprocatory movement under the action of a double electrically controlled plunger piston 139 associated with two coils 136 and 137 wound in opposite directions and interconnected at 138, the armature or piston 139, engaging said coils through its free end and rigid with the control rod 140, controlling the slide valve 130.

To the head 71 is further pivotally secured a rod 141 carrying two adjustable stops 142 and 143 adapted to act on the blade 144 pivotally secured to a stationary point 145 and forming part of a reversing snap switch. The operation of the control means is as follows:

The slide valve 130 being in the position illustrated in Fig. 17, the piston 123 receives the driving fluid on its left hand side and urges the head 71 towards the right hand side of Fig. 17.

When the piston reaches the right hand end of its stroke, the stop 142 causes the blade 144 to rock towards the right hand side of Fig. 17 and the electric current from the mains passes through the wire 146, the contact piece 147, the wire 148, the coil 136, the connecting point 138 and the wire 149. The energized coil 136 draws out the armature-forming piston 139, whereby the slide valve 130 is drawn towards the right hand side of Fig. 17. The driving fluid passes through 132, 133, 131, 128, 126 towards the right hand side of the piston 123 which moves towards the left and carries along with it the head 71 in a direction opposed to its preceding movement.

When the piston is near the left hand end of its stroke, the stop 143 makes the blade 144 rock towards the left and the electric current passes through the wire 146, the contact-piece 150, the wire 151, the coil 137 and back through the point 138 to the wire 149. The coil 137 is energized and draws in the armature 139, which leads to a shifting towards the left of the slide valve 130 so that the driving fluid is fed through 132, 133, 131, 127, 125 towards the left hand side of the piston 123 and the head 71 is again shifted towards the right hand side of Fig. 1 and the cycle of operations begins over again as precedingly.

In the pipe 132 is provided an adjusting cock or valve 152 constituted preferably, as illustrated in Fig. 18, by a needle valve 153 having a frusto-conical end, whereby a gradual closing and opening of the cock is obtained through a gradual throttling of the driving fluid between the frusto-conical wall of the needle valve 153 and the wall of the pipe 154 through which the driving fluid is admitted into the pipe 132.

In the case of Fig. 17, the adjustment of the travel of the head 71 and linking member 62 and consequently of the amplitude of the shifting of the fork 53, 54, is performed by adjusting the location of the stops 142 and 143 on the rod 141 carrying them.

By reason of the longitudinal movement thus imparted to the head 71, the link 62 is drawn in one direction or pushed back in the other direction. To the horizontal movements of the head 71 in both directions, correspond an upward and a downward running of the rollers 64 over the rails 65, and this leads consequently to a rising or a lowering of the pivotal connections 28 and consequently of the knee joint of the patient (Fig. 1).

What we claim is:

1. An apparatus for carrying and shifting the lower limbs of a patient after a surgical operation, to provide selectively the movement and the immobilization of a lower limb submitted to an osteo-articular post-traumatic lesion and its slow and gradual mobilization to prevent anchylosis, said apparatus comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh bone of the patient resting on the seat, the pivotal connection between the two first sections of the cradle registering with the location of the patient's knee joint and the pivotal connection between the sections carrying the calf and the foot of the patient registering with the location of the patient's ankle joint, and means adapted to mechanically shift in a substantially vertical plane the two first sections of the cradle to produce the desired slow and continuous mobilization of the patient's joints.

2. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means for shifting laterally the seat with reference to the thigh-carrying section of the cradle, means for pivotally securing the thigh section of the cradle selectively to the portions of the seat corresponding respectively to the left side of the patient and to the right side of said patient, the pivotal axis between the seat and the thigh-carrying section registering with the location of the upper end of the thigh bone of the patient resting on the seat, the pivotal connection between the two first sections of the cradle registering with the location of the patient's knee joint and the pivotal connection between the sections carrying the calf and the foot of the patient registering with the location of the patient's ankle joint, and means adapted to mechanically shift in a substantially vertical plane the two first sections of the cradle to produce the desired slow and continuous mobilization of the patient's joints.

3. An apparatus for carrying and shifting the lower limbs of a patient after a surgical operation, comprising a seat including a medial removable section, a deformable cradle including three sections of which the first section is pivotally secured selectively to a portion of the seat in register with the location of the upper end of one thigh of a patient resting on the seat, and two further sections adapted to carry the calf and the foot of the patient and pivotally interconnected at a point registering with the ankle of the patient resting on the seat, the first section of the cradle being pivotally connected with the second, calf-carrying section, through a pivotal connection registering with the knee joint of the patient, and means for mechanically shifting the interconnected sections of the cradle in a substantially vertical plane, to produce a slow and gradual mobilization of the patient's joints.

4. An apparatus for carrying and shifting a lower limb of a patient after a surgical operation, comprising a seat for said patient, a first cradle section including two parallel central tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, a strap pivotally secured to the seat along a transverse line of the latter and pivotally secured to the outer elongated members of the corresponding first cradle section along a line registering with the upper end of the thigh-bone of the patient resting on the seat, a second cradle section including also two parallel tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, means for pivotally interconnecting the ends of the outer elongated members in the first section with the corresponding inner members of the second section, a foot rest, means pivotally securing the foot-rest to the outer elongated members of the second cradle section, longitudinally sliding means to which the foot rest is secured and means adapted to mechanically shift in a substantially vertical plane the said two sections of the cradle to produce the desired slow and continuous mobilization of the patient's joints.

5. An apparatus for carrying and shifting a lower limb of a patient after a surgical operation, comprising a seat for said patient, a first cradle section including two parallel central tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, a strap pivotally secured to the seat along a transverse line of the latter and pivotally secured to the outer elongated members of the corresponding first cradle section along a line registering with the upper end of the thigh-bone of the patient resting on the seat, a second cradle section including also two parallel tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid with the nuts, means for pivotally interconnecting the ends of the outer elongated members in the first section with the corresponding inner members of the second section, a foot-rest, means pivotally securing the foot-rest to the outer elongated members of the second cradle section, a support detachably and adjustably mounted on said foot rest for holding the patient's heel at the desired height, longitudinally sliding means to which the foot rest is secured and means adapted to mechanically shift in a substantially vertical plane the said two sections of the cradle to produce the desired slow and continuous mobilization of the patient's joints.

6. An apparatus for carrying and shifting a lower limb of a patient after a surgical operation, comprising a seat for said patient, a first cradle section which includes two parallel central tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, a strap pivotally secured to the seat along a transverse line of the latter and pivotally secured to the outer elongated members of the corresponding first cradle section along a line registering with the upper end of the thigh-bone of the patient resting on the seat, a second cradle section including also two parallel tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, means for pivotally connecting the ends of the outer elongated members in the first section with the corresponding inner member of the second section, a foot-rest, means pivotally securing the foot-rest to the outer elongated members of the second cradle section, longitudinally sliding means to which the foot-rest is secured, means for adjusting the slope of the foot-rest to the desired angular value and means adapted to mechanically shift in a substantially vertical plane the said two sections of the cradle to produce the desired slow and continuous mobilization of the patient's joints.

7. An apparatus for carrying and shifting a lower limb of a patient after a surgical operation, comprising a seat for said patient, a first cradle section including two parallel central tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, a strap pivotally secured to the seat along a transverse line of the latter and pivotally secured to the outer elongated members of the corresponding first cradle section along a line registering with the upper end of the thigh bone of the patient resting on the seat, a second cradle section including also two parallel tubes, a short sleeve rigid with the inside of each central tube, a rod coaxial with each central tube and rigid with the sleeve therein and the ends of which are provided with threads of opposite pitches, nuts screwed over each of said ends and elongated members coaxial with each central tube and rigid respectively with the corresponding nuts associated with the latter, means for pivotally interconnecting the ends of the outer elongated members in the first section with the corresponding inner members of the second section, a foot-rest, means pivotally securing the foot-rest to the outer elongated members of the second cradle section, a runway extending longitudinally of the apparatus, a carriage adapted to run over said runway and to which the foot-rest is secured in an adjustable angular position and means adapted to mechanically shift in a substantially vertical plane the two said sections of the cradle to produce the desired slow and continuous mobilization of the patient's joints.

8. An apparatus for carrying and shifting the lower limbs of a patient after a surgical operation, comprising a seat for the patient, a deformable cradle including three sections pivotally secured to one another and adapted to carry respectively the thigh, the calf and the foot of the patient, means whereby the thigh-carrying section is pivotally secured to the seat, to register with the location of the upper end of the thigh-bone of the patient resting on the seat, the pivotal connection between the two first sections of the cradle registering with the location of the patient's knee-joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, a head carried by the outer end of said linking member and adapted to rock round a transverse axis with reference thereto and means for making said head assume a reciprocating movement longitudinally of the apparatus and means over which the foot-carrying section is longitudinally shiftable.

9. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh-bone of the patient resting on the seat, the pivotal connection between the two first sections of the cradle registering with the location of the patient's knee-joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, rollers revolubly carried by the fork in register with the pivotal connection between said fork and the linking member and adapted to rock round the axis of said pivotal connection, arcuate guiding rails extending in longitudinal vertical planes and adapted to be engaged by the corresponding rollers, a head carried by the outer end of said linking member and adapted to rock round a transverse axis with reference thereto and means for making said head assume a reciprocating movement longitudinally of the apparatus.

10. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh-bone of the patient resting on the seat, the pivotal connections between the two first sections of the cradle registering with the location of the patient's knee joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, means whereby the connection between the fork and the cradle sections allows said fork to rock slightly with reference to the cradle sections in a transverse direction, to prevent any friction from arising through the relative movements of the three sections of the cradle in a strictly vertical plane, a head carried by the outer end of said linking member and adapted to rock round a transverse axis with reference thereto and means for making said head assume a reciprocating movement longitudinally of the apparatus.

11. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh bone of the patient resting on the seat, the pivotal connection between the two first sections of the cradle registering with the location of the patient's knee joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, a head carried by the outer end of said linking member and adapted to rock round a transverse axis with reference thereto, a hydraulic system including a cylinder and a driving piston therein, said piston being rigid with said last mentioned head, a slide-valve adapted to feed alternatingly driving fluid onto either surface of the driving piston inside its cylinder, means for electromagnetically controlling the reciprocatory movement of the slide valve, adjustable stops rigid with the head, an electric circuit controlling said electromagnetic control means and a switch in said circuit controlled alternatingly by the stops to reverse periodically the action of the electro-magnetic means.

12. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh-bone of the patient resting on the seat, the pivotal connection between the two first sections of the cradle registering with the location of the patient's knee joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, a head carried by the outer end of said linking member and adapted to rock round a transverse axis with reference thereto, a hydraulic system including a cylinder and a driving piston therein, said piston being rigid with said last mentioned head, a slide-valve adapted to feed alternatingly driving fluid onto either surface of the driving piston inside its cylinder, an armature rigid with the slide valve, an electromagnetic system including two interconnected windings wound in opposite directions and capable when energized of urging said armature respectively in opposite directions, an electrical circuit system connected with the point of interconnection between the two windings, adjustable stops rigid with the head and switching means in the circuit system adapted to close the circuit system selectively with one of said two windings at each end of the stroke of the armature upon impact of the corresponding stop on said switching means.

13. An apparatus for carrying and shifting the lower limbs of a patient after a surgical operation, comprising a seat for the patient, a deformable cradle including three sections pivotally secured to each other and adapted to carry respectively the thigh, the calf and the foot of the patient, means whereby the thigh-carrying section is pivotally secured to the seat, to register with the location of the upper end of the thigh-bone of the patient resting on the seat, the pivotal connection between the two first sections of the cradle registering with the location of the patient's knee-joint and the pivotal connection between the sections carrying the calf and the foot of the patient registering with the location of the patient's ankle joint, a fork of adjustable length pivotally secured to the cradle along the line interconnecting the two first sections, a linking member pivotally connected with the outer end of said fork and extending longitudinally of the apparatus in the vertical medial plane of the fork, a head carried by the outer end of said linking member and adapted to rock round a transverse axis with reference thereto, a hydraulic system including a cylinder and a driving piston therein, said piston being rigid with said last mentioned head, a slide-valve connected to the opposite ends of said cylinder for alternatingly feeding driving fluid onto either surface of the driving piston inside its cylinder, a pipe connected to said slide valve 4 feeding the driving fluid thereto, a gradually acting frustoconical needle valve connected to said feeding pipe for controlling the admission of driving fluid through said pipe into the slide-valve, a further pipe connected to said slide valve for exhausting the driving fluid therefrom, means for electromagnetically controlling the reciprocatory movement of the slide-valve, adjustable stops rigid with the head and an electric circuit connected to and controlling said electromagnetic control means and a switch in said circuit controlled alternatingly by the stops to reverse periodically the action of the electro-magnetic means.

References Cited in the file of this patent

UNITED STATES PATENTS

| | | |
|---|---|---|
| 238,799 | Morgan | Mar. 15, 1881 |
| 2,681,650 | Goss | June 22, 1954 |